United States Patent
Delin et al.

(10) Patent No.: US 11,940,315 B2
(45) Date of Patent: Mar. 26, 2024

(54) NON-INTRUSIVE CONTACTLESS FILLING LEVEL DETERMINATION SYSTEM AND METHOD

(71) Applicant: Rosemount Tank Radar AB, Mölnlycke (SE)

(72) Inventors: Håkan Delin, Linköping (SE); Lars-Ove Larsson, Linköping (SE); Stig Larsson, Sävedalen (SE); Peter Schachinger, Kullavik (SE); Thomas Örtenberg, Västra Frölunda (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 3 days.

(21) Appl. No.: 17/834,311

(22) Filed: Jun. 7, 2022

(65) Prior Publication Data
US 2023/0003571 A1     Jan. 5, 2023

(30) Foreign Application Priority Data
Jul. 5, 2021   (EP) ...................................... 21183721

(51) Int. Cl.
    *G01F 23/284*     (2006.01)
    *G01F 22/00*     (2006.01)
    *G01F 25/20*     (2022.01)

(52) U.S. Cl.
    CPC .......... *G01F 23/2845* (2013.01); *G01F 22/00* (2013.01); *G01F 23/284* (2013.01); *G01F 25/20* (2022.01)

(58) Field of Classification Search
CPC .... G01F 23/2845; G01F 22/00; G01F 23/284; G01F 25/20
See application file for complete search history.

(56) References Cited

U.S. PATENT DOCUMENTS

| | | | |
|---|---|---|---|
| 5,821,424 A | 10/1998 | Rodriguez | |
| 2011/0266394 A1 | 11/2011 | Erben et al. | |

(Continued)

FOREIGN PATENT DOCUMENTS

| | | | | |
|---|---|---|---|---|
| CA | 2 294 217 | | 1/1999 | |
| CN | 1252454 C | * | 4/2006 | ........... G01F 23/284 |

(Continued)

OTHER PUBLICATIONS

Extended European Search Report from European Patent Application No. 21183721.6, dated Jan. 12, 2022.

*Primary Examiner* — Ryan D Walsh
(74) *Attorney, Agent, or Firm* — Westman, Champlin & Koehler, P.A.

(57) ABSTRACT

A filling level determination system, for determining a filling level of a product in a tank, comprising a measurement unit for arrangement at a measurement position, the measurement unit including a transceiver; and an antenna arrangement coupled to the transceiver for radiating an electromagnetic transmit signal generated by the transceiver from the measurement position towards a target position on the tank wall, and for returning an electromagnetic first reflection signal resulting from reflection of the transmit signal at the target position back towards the transceiver; and processing circuitry coupled to the transceiver of the measurement unit and being configured to determine the filling level based on tank deformation data indicative of a known relation between the level of the product in the tank and deformation of the tank at the first target position, and a timing relation between the first transmit signal and the first reflection signal.

14 Claims, 7 Drawing Sheets

(56) References Cited

U.S. PATENT DOCUMENTS

2012/0281096 A1 11/2012 Gellaboina et al.
2022/0163625 A1* 5/2022 Delin ..................... G01S 7/356

FOREIGN PATENT DOCUMENTS

| | | | |
|---|---|---|---|
| DE | 101 09 058 | 5/2002 | |
| DE | 10 2008 031 882 | 1/2010 | |
| EP | 2 078 937 | 11/2010 | |
| EP | 3792198 A1 * | 3/2021 | ............. G01F 23/68 |
| FR | 2 766 255 | 1/1999 | |
| WO | WO 2012/107114 | 8/2012 | |
| WO | WO-2013070131 A1 * | 5/2013 | ............. B65D 88/34 |

* cited by examiner

NON-INTRUSIVE CONTACTLESS FILLING LEVEL DETERMINATION SYSTEM AND METHOD

CROSS-REFERENCE TO RELATED APPLICATION

This application claims priority to European Patent Application No. 21183721.6, filed Jul. 5, 2021, the content of which is hereby incorporated by reference in its entirety.

TECHNICAL FIELD OF THE INVENTION

The present invention relates to a filling level determination system and method, for determining a filling level of a product in a tank having a tank wall separating an inside of the tank from an outside of the tank.

TECHNICAL BACKGROUND

Determination of the filling level of a product in a tank is usually done with a filling level determination system including at least one part, such as a probe or an antenna, arranged on the inside of the tank. This typically requires a tank feed-through, through a hole made in the tank wall for the filling level determination. At least in some applications, such as for filling level determination in tanks with extreme temperatures and/or aggressive products, this may add cost and complexity and/or be technically difficult.

It has been proposed to attach strain gauges to the outside of a tank, and estimate the filling level based on signals from the strain gauges. For instance, it has been suggested to deduce a mass of the tank (including the product in the tank) by sensing deformation of a supporting structure. According to another approach, described in DE 10109058, the filling level in a fuel tank of a car is determined using one or more strain gauges arranged at the bottom of the fuel tank.

Although the use of strain gauges alleviates the need for a tank feed-through, there appear to be remaining issues related to, for example, reliability and accuracy of the filling level determination.

SUMMARY OF THE INVENTION

In view of the above, a general object of the present invention is to provide an improved system and method for filling level determination without a tank feed-through.

According to a first aspect of the present invention, it is therefore provided a filling level determination system, for determining a filling level of a product in a tank having a tank wall separating an inside of the tank from an outside of the tank, the filling level determination system comprising: a first measurement unit for arrangement at a first measurement position on the outside of the tank, the first measurement unit including a transceiver for generating, transmitting and receiving electromagnetic signals; and an antenna arrangement coupled to the transceiver for radiating an electromagnetic first transmit signal generated by the transceiver from the first measurement position towards a first target position on the tank wall, and for returning an electromagnetic first reflection signal resulting from reflection of the first transmit signal at the first target position back towards the transceiver; memory for storing tank deformation data indicative of a known relation between the level of the product in the tank and deformation of the tank at the first target position, and reference data indicative of a reference distance between the first measurement position and the first target position for a known level of the product in the tank; and processing circuitry coupled to the transceiver of the first measurement unit and to the memory, the processing circuitry being configured to: acquire the tank deformation data and the reference data from the memory; and determine the filling level based on the tank deformation data, the reference data, and a timing relation between the first transmit signal and the first reflection signal.

The "transceiver" may be one functional unit capable of transmitting and receiving microwave signals, or may be a system comprising separate transmitter and receiver units. It should also be noted that the processing circuitry may be provided as one device or several devices working together.

The present invention is based on the realization that contactless measurement of a distance, or a distance change, between a fixed measurement position and a target position on the outside of the tank wall can provide the advantages of non-intrusive filling level measurement without drawbacks associated with use of strain gauges or similar that require good and stable mechanical connection with the tank wall and that are subjected to potentially harsh conditions at the tank wall. Such harsh conditions may include extreme temperatures, condensation or ice, and vibration.

The measurement is based on an analysis of a timing relation between at least one electromagnetic transmit signal radiated towards the outside of the tank wall, and at least one corresponding electromagnetic reflection signal resulting from reflection of the transmit signal at the outside of the tank wall.

According to embodiments, the transceiver of the first measurement unit may be configured to form a measurement signal based on the first transmit signal and the first reflection signal, the measurement signal being indicative of at least a phase difference between the first transmit signal and the first reflection signal; and the processing circuitry may be configured to determine the filling level based on the tank deformation data, the reference data, and the measurement signal.

Analysis of the phase difference between the reflection signal and the transmit signal can provide considerably higher accuracy (in the order of 10 µm or better for typical frequency ranges and measurement sweep configurations) than analysis of the frequency difference between the reflection signal and the transmit signal (in the order of 1 mm for typical frequency ranges and measurement sweep configurations).

For this measurement technique, CW (continuous wave) or FMCW (frequency modulated continuous wave) radar systems may be used. Such radar systems are, per se, well-known to one of ordinary skill in the art.

In conventional contactless filling level determination systems using FMCW-techniques, phase information is generally not used because the relation between the phase information and distance is not unambiguous for typical distance ranges.

The present inventors have now surprisingly found that the more accurate phase difference measurement can yield unambiguous measurement results for the non-intrusive contactless measurement system according to embodiments of the present invention, due to the much smaller measurement range required. For instance, depending on the properties of the tank and the arrangement of the measurement unit(s), a change in tank wall deformation of about 1 mm may correspond to a change in filling level of about 1 m.

According to various embodiments, the filling level determination system may be configured to acquire a measure indicative of an orientation of the tank; and the processing circuitry may be configured to determine the filling level additionally based on the acquired measure indicative of the orientation of the tank. This may provide for improved, such as more reliable, filling level determination, since possible tank leaning can be detected and compensated for.

In embodiments, the filling level determination system may further comprise a second measurement unit for arrangement at a second measurement position on the outside of the tank, different from the first measurement position, the second measurement unit including a transceiver for generating, transmitting and receiving electromagnetic signals; and an antenna arrangement coupled to the transceiver for radiating an electromagnetic second transmit signal generated by the transceiver from the second measurement position towards a second target position on the tank wall, and for returning an electromagnetic second reflection signal resulting from reflection of the transmit signal at the second target position back towards the transceiver. The tank deformation data may be additionally indicative of a known relation between the level of the product in the tank and deformation of the tank at the second target position; the reference data may be additionally indicative of a reference distance between the second measurement position and the second target position for a known level of the product in the tank; and the processing circuitry may be configured to determine the filling level additionally based on a timing relation between the second transmit signal and the second reflection signal.

According to a second aspect of the present invention, it is provided a method of determining a filling level of a product in a tank having a tank wall separating an inside of the tank from an outside of the tank, the method comprising the steps of: radiating an electromagnetic first transmit signal from a first measurement position towards a first target position on the tank wall; receiving an electromagnetic first reflection signal resulting from reflection of the first transmit signal at the first target position; acquiring tank deformation data indicative of a known relation between the level of the product in the tank and deformation of the tank at the first target position, and reference data indicative of a reference distance between the first measurement position and the first target position for a known level of the product in the tank; and determining the filling level based on the tank deformation data, the reference data, and a timing relation between the first transmit signal and the first reflection signal.

In summary, the present invention thus relates to a filling level determination system, for determining a filling level of a product in a tank, comprising a measurement unit for arrangement at a measurement position, the measurement unit including a transceiver; and an antenna arrangement coupled to the transceiver for radiating an electromagnetic transmit signal generated by the transceiver from the measurement position towards a target position on the tank wall, and for returning an electromagnetic first reflection signal resulting from reflection of the transmit signal at the target position back towards the transceiver; and processing circuitry coupled to the transceiver of the measurement unit and being configured to determine the filling level based on tank deformation data indicative of a known relation between the level of the product in the tank and deformation of the tank at the first target position, and a timing relation between the first transmit signal and the first reflection signal.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

Figure 1A:
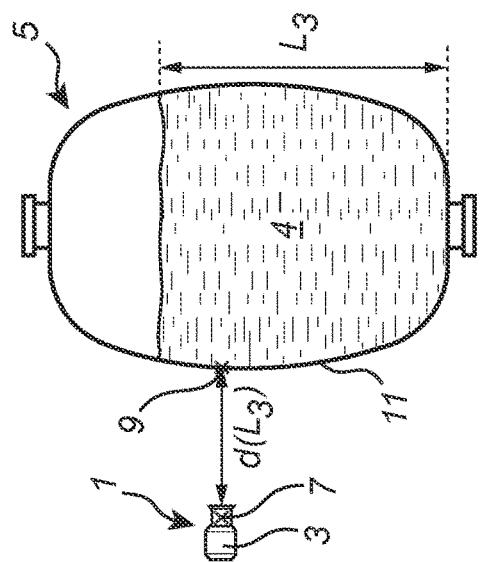
FIGS. 1A-C schematically show a first example embodiment of the filling level determination system according to the present invention in one example arrangement for non-intrusive contactless determination of the filling level of a product in a tank.
Figure 1B:
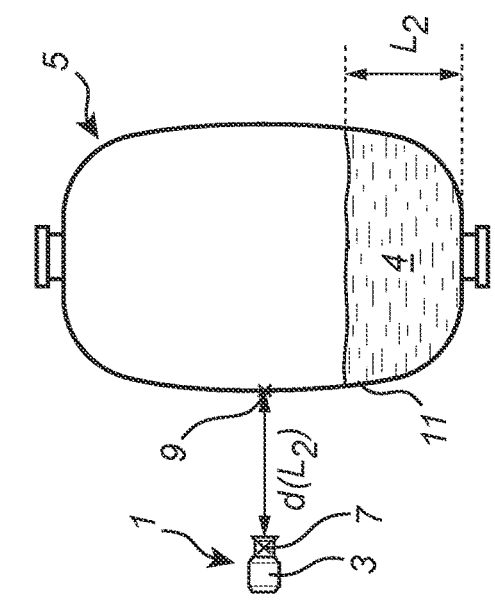
Figure 1C:
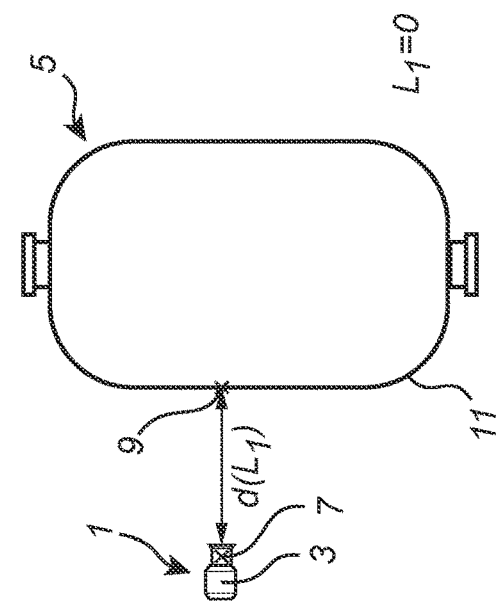

FIGS. 1A-C schematically show a first example embodiment of the filling level determination system 1 according to the present invention in one example arrangement for non-intrusive contactless determination of the filling level of a product 4 in a tank 5.

The filling level determination system 1 in FIGS. 1A-C comprises a measurement unit 3 arranged at a measurement position 7 at the outside of the tank 5. In FIG. 1A, the tank 5 is empty ($L_1$=0), and the distance between the measurement position 7 and a target position 9 on the tank wall 11 is $d(L_1)$. In FIG. 1B, there is product 4 in the tank 5 up to the indicated level $L_2$, and the distance between the measurement position 7 and the target position 9 on the tank wall 11 is $d(L_2)$. In FIG. 10, there is product 4 in the tank 5 up to the indicated level $L_3$, and the distance between the measurement position 7 and the target position 9 on the tank wall 11 is $d(L_3)$. As is schematically indicated in FIGS. 1A-C, the increasing filling level results in increased bulging of the tank wall 11 (the bulging of the tank wall 11 is exaggerated in FIGS. 1A-C for the purpose of illustration). Accordingly, an unknown filling level can be determined based on a measured distance (or distance change) between the measurement position 7 and the target position 9, and a known relation between the filling level L and the deformation of the tank wall 11 at the target position 9.

Figure 2:
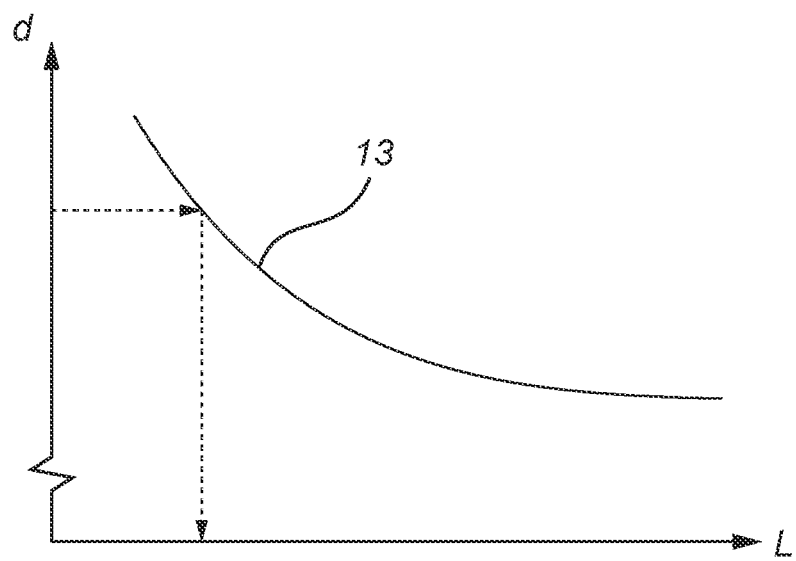
FIG. 2 is a representative relation between the filling level of the product in the tank and the distance between the measurement unit and the outside of the tank wall in the example arrangement in FIGS. 1A-C.

FIG. 2 is a diagram schematically showing an example of such a known relation, represented by the curve 13. As is schematically indicated in FIG. 2, a measured distance d can be correlated to a filling level L using the curve 13.

There are several feasible ways in which a person of ordinary skill in the art could determine the relation between the level of product in the tank and deformation of the tank. For instance, an empty tank with known dimensions could be filled with a series of known volumes of the relevant product, and the deformation could be measured for these known volumes. It is straight-forward to translate the known volumes to known levels. Alternatively or in combination, conventional "intrusive" filling level measurements may be correlated with deformation measurements during mapping of the tank-product combination. According to a further alternative, the relation between filling level and deformation could be modeled with standard techniques using known properties of the product and a mathematical model of the tank.

Figure 3:
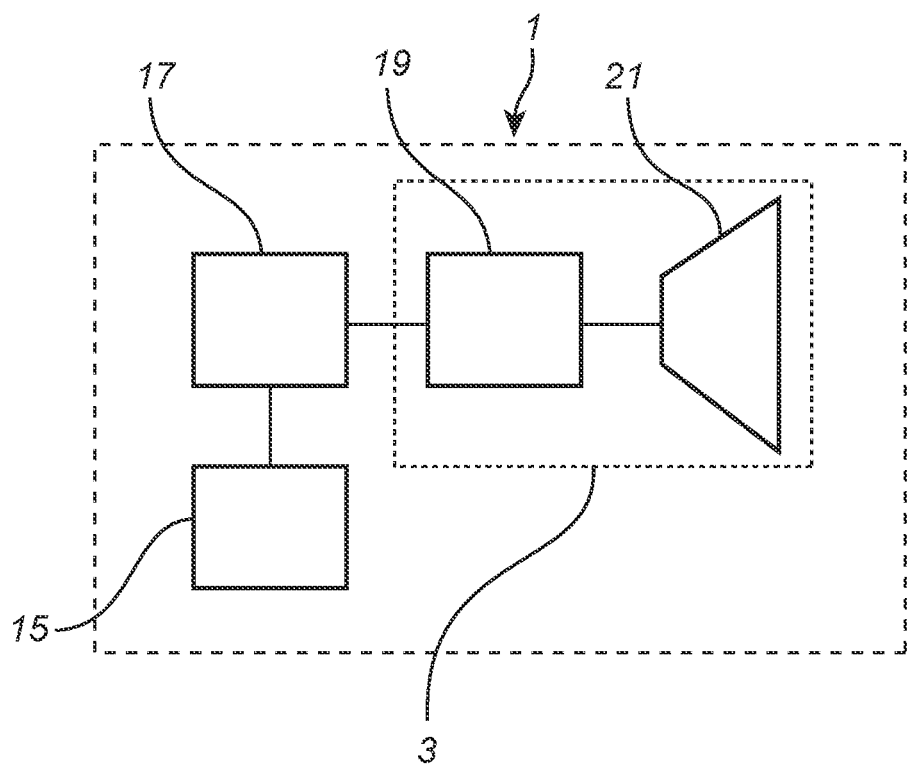
FIG. 3 is a schematic block diagram of the filling level determination system in FIGS. 1A-C.

The filling level determination system 1 in FIGS. 1A-C will now be described in more detail with reference to the schematic block diagram in FIG. 3. Referring to FIG. 3, the filling level determination system 1 comprises a measurement unit 3, a memory 15, and processing circuitry 17. The measurement unit 3 comprises a transceiver 19 and an antenna arrangement 21. The transceiver 19 is configured to generate, transmit, and receive electromagnetic signals, and the antenna arrangement 21 is coupled to the transceiver 19 for radiating an electromagnetic transmit signal towards the target position 9 and returning a reflection signal resulting from reflection of the transmit signal at the target position back to the transceiver 19 (referring to FIGS. 1A-C) when the measurement unit 3 is arranged at the measurement position 7. The antenna arrangement 21 may be any antenna arrangement that is suitable for the implementation, and may, for example, include one or more of a horn antenna, a lens antenna, a rod antenna, a parabolic antenna, and a patch antenna. An example embodiment of the transceiver will be described in greater detail further below with reference to FIG. 4.

The memory 15 is configured to store tank deformation data indicative of a known relation between the level L of the product 4 in the tank 5 and deformation of the tank 5 at the first target position 9, and reference data indicative of a reference distance between the measurement position 7 and the target position 9 for a known level of the product 4 in the tank 5. The deformation data may be represented by the curve 13 mentioned above with reference to FIG. 2, or any other suitable representation, such as a look-up-table or a function. The reference data may indicate the distance between the measurement position 7 and the target position 9 for any known level, such as for an empty tank or a full tank, etc.

The processing circuitry 17 is coupled to the transceiver 19 of the measurement unit 3 and to the memory 15, and is configured to acquire the above-mentioned tank deformation data and reference data from the memory 15, and determine the filling level L based on the tank deformation data, the reference data, and a timing relation between the transmit signal and the reflection signal.

Generally speaking, the timing relation between the transmit signal and the reflection signal can be analyzed by the processing circuitry 17 to estimate the time between transmission of the transmit signal and reception of the reflection signal. Based on this time and the speed of light in the medium between the antenna arrangement 21 and the tank wall 11, the distance can be determined. Various ways of achieving this using pulsed signals and frequency modulated continuous signals are well-known to those of ordinary skill in the art of radar level gauging. An example technique that may be especially suitable for achieving sufficient accuracy will be described in detail further below with reference to FIGS. 5A-C.

Figure 4:
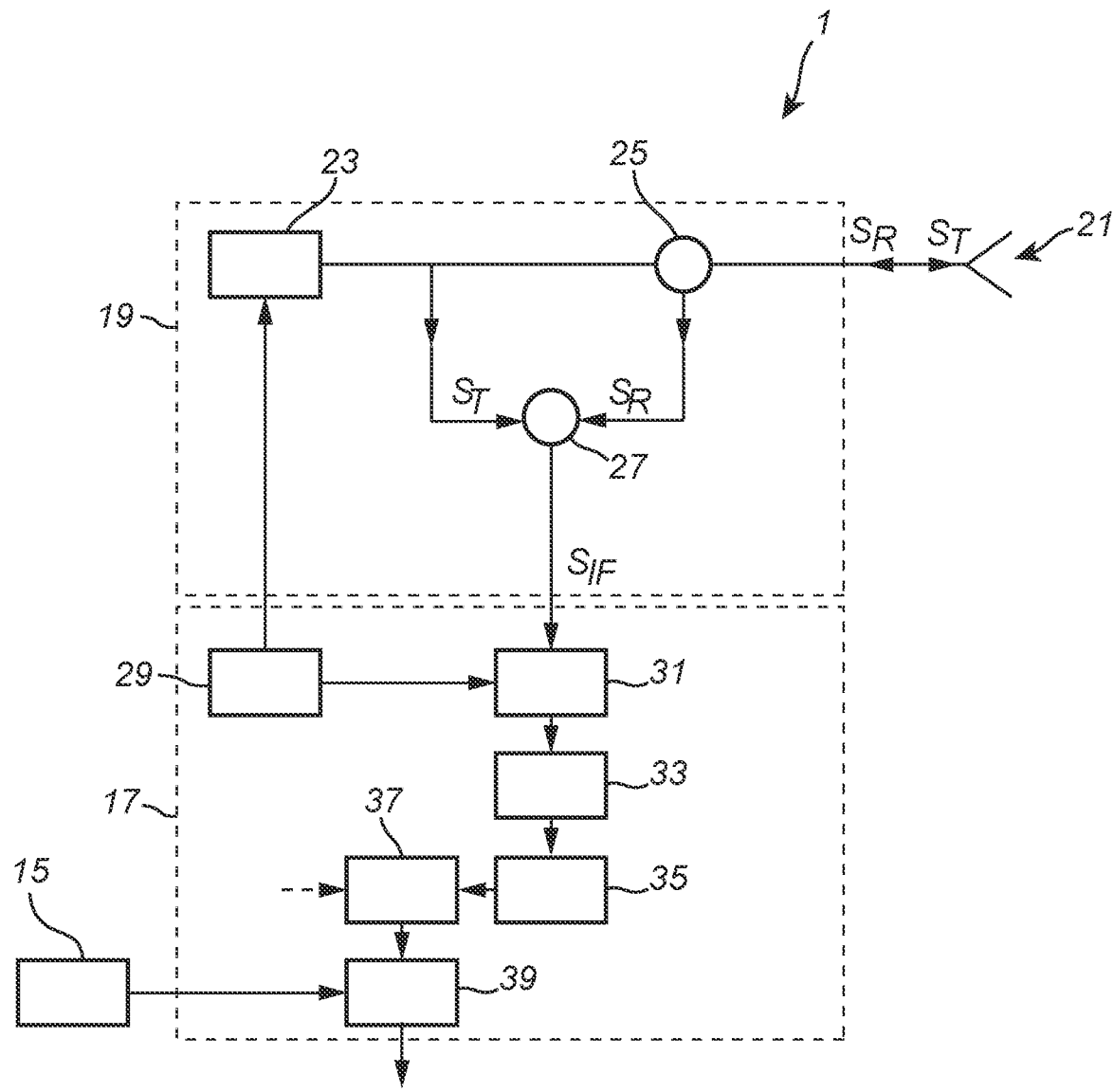
FIG. 4 is a schematic block diagram of the measurement unit comprised in the filling level determination system in FIG. 3.

FIG. 4 is a partial and simplified schematic block diagram of an example configuration of the filling level determination system 1 in FIG. 3.

The transceiver 19 is here shown as including a microwave source 23, a power divider 25, and a mixer 27. The processing circuitry 17 is shown as including timing circuitry 29, a sampler 31, an FFT block 33, a phase determining block 35, an internal memory 37, and a filling level determining block 39.

As is schematically indicated in FIG. 4, the timing circuitry 29 is coupled to the microwave source 23 to control the microwave source 23 to generate a transmit signal $S_T$. The microwave source 23 is connected to the antenna 21 via the power divider 25, and thus provides the transmit signal $S_T$ to the antenna 21. The reflection signal $S_R$ from the antenna 21 is routed by the power divider 25 to the mixer 27, which is also connected to receive the signal from the microwave source 23. The transmit signal $S_T$ provided by the microwave source 23 and the reflection signal $S_R$ from the antenna 21 are combined to form a measurement signal, which is here referred to as intermediate frequency signal $S_{IF}$. The term "intermediate frequency signal" is generally used to describe a signal resulting from mixing the transmit signal and the reflection signal in a system of the FMCW-type. This signal will be indicative of a difference in frequency (if any) as well as a difference in phase between the transmit signal and the reflection signal. As will be evident to one of ordinary skill, the measurement signal resulting from mixing the transmit signal and the reflection signal in a system of the CW-type will not be indicative of a difference in frequency for this application, because the frequency of the transmit signal is constant.

As is schematically shown in FIG. 4, the intermediate frequency signal $S_{IF}$ is sampled by the sampler 31, which may be controlled by the timing circuitry 29 to be synchronized with the transmit signal $S_T$. The sampled intermediate frequency signal $S_{IF}$ is further processed by the FFT-block 33 and the phase determining block 35 to determine the phase of the intermediate frequency signal $S_{IF}$. The phase is stored in the internal memory 37, optionally together with auxiliary data, such as temperature data, as is schematically indicated by the dashed arrow in FIG. 4. Based on the phase data, and optional auxiliary data, stored in the internal memory 37, and the above-mentioned tank deformation data and reference data stored in the memory 15, the level determining block 39 determines the filling level L in the tank 5, and provides a signal indicative thereof.

While the elements of the transceiver 19 are typically implemented in hardware, and may form part of an integrated unit normally referred to as a microwave unit, at least some portions of the processing circuitry 17 may be embodied by software modules executed by an embedded processor. The invention is not restricted to this particular realization, and any implementation found suitable to realize the herein described functionality may be contemplated.

Figure 5A:
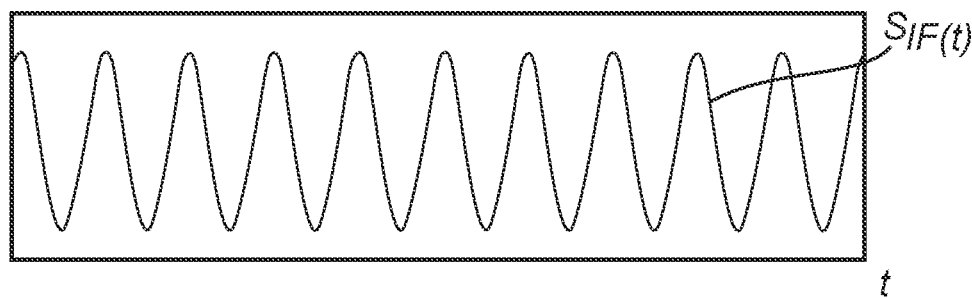
FIGS. 5A-C are diagrams schematically illustrating the use of the phase difference between the reflection signal and the transmit signal for filling level determination, in example embodiments of the filling level determination system according to the present invention.
Figure 5B:
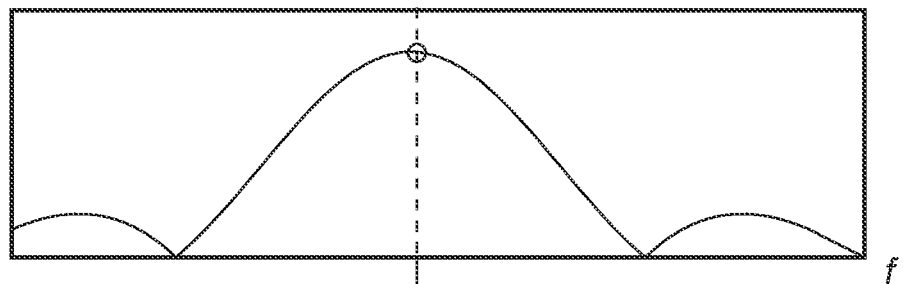
Figure 5C:
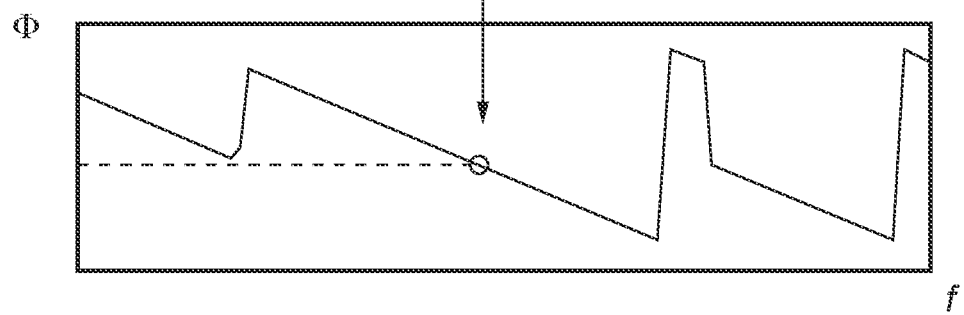

An exemplary way of determining the deformation of the tank wall 11 based on the acquired phase of the intermediate frequency signal will now be described with reference to the illustrations in FIGS. 5A-C. The transmit signal $S_T$ and the reflection signal $S_R$ are first combined to form the so-called intermediate frequency signal $S_{IF}$, using techniques that are per se well-known in the art of FMCW-type radar level gauge systems. An exemplary intermediate frequency signal $S_{IF}$, is shown, in the time domain, in FIG. 5A.

Thereafter, a phase φ of the intermediate frequency signal $S_{IF}$ is determined. According to embodiments of the invention, this may be done by transforming the intermediate frequency signal $S_{IF}$ to the frequency domain, for example by means of the FFT-block 33 in FIG. 4, identifying the frequency corresponding to reflection at the tank wall 11 (the frequency at which the intermediate frequency signal carries the largest amount of energy), and determining the phase φ of the intermediate frequency signal $S_{IF}$ for this frequency. This procedure is schematically illustrated by FIG. 5B, showing the energy carried by the intermediate frequency signal $S_{IF}$ as a function of frequency, and FIG. 5C, showing the phase as a function of frequency. It should be noted that FIG. 5B and FIG. 5C are zoomed in on a rather narrow frequency interval around the frequency of the intermediate frequency signal corresponding to reflection of the transmit signal at the tank wall 11. The phase φ is stored in the internal memory 37. For small changes in distance, the change of the phase can be used to unambiguously determine the change in distance with high accuracy.

For example, the phase of the intermediate frequency signal associated with the previous measurement operation may be retrieved from the internal memory 37, and a phase change may be determined. Based on the phase change, a change in the deformation of the tank wall 11 at the target position can be determined with high accuracy.

Substantially same procedure may be used for a CW-radar system, in which the frequency is not modulated. In such a case, there is obviously no need to identify the frequency corresponding to reflection at the tank wall, as there is only one frequency. Also for the FMCW-case described above, this step may be omitted, depending on the system configuration, such as the frequency range of the frequency sweep.

Figure 6:
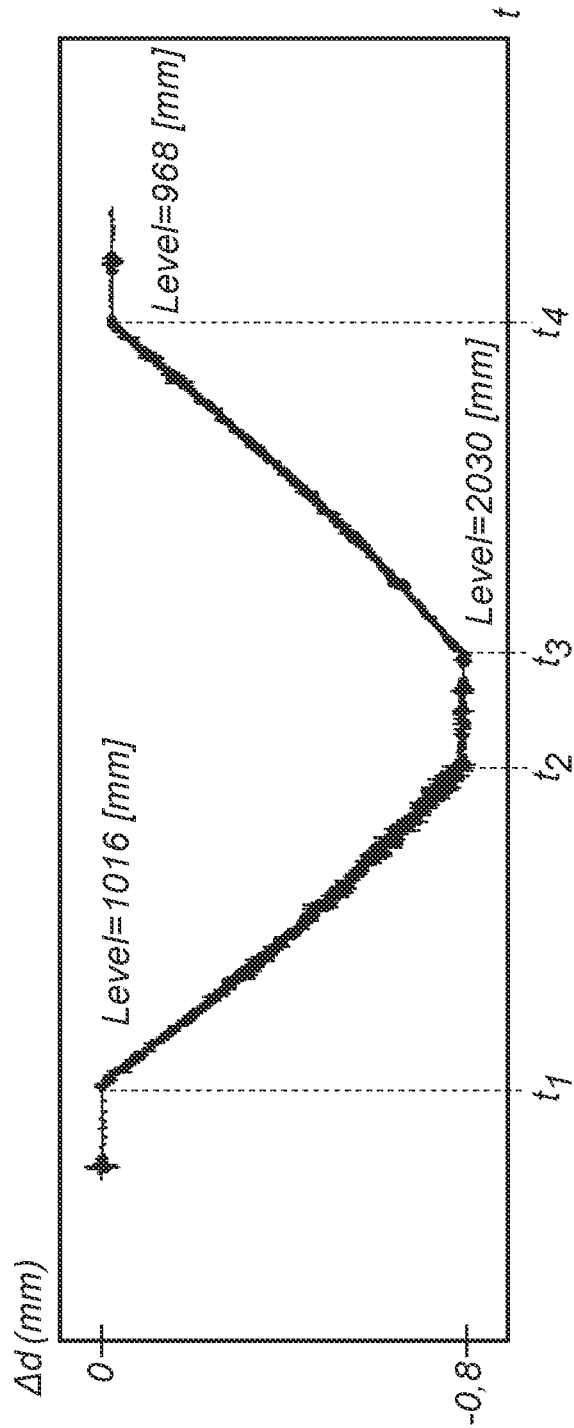
FIG. 6 is a diagram of a filling level determination carried out using the phase difference between the reflection signal and the transmit signal.

FIG. 6 is a diagram of a filling level determination carried using the phase difference between the reflection signal $S_R$ and the transmit signal $S_T$.

The test results presented below were obtained using a steel tank containing water. The tank had a conventional radar level gauge system arranged to measure the filling level based on reflection of electromagnetic signals on the surface of the product in the tank.

Until a first time $t_1$, the water level was kept stationary with a filling level of 1016 mm as measured using the conventional radar level gauge system. At the first time $t_1$, supply of water was started and maintained at a constant flow rate until a second time $t_2$. At the second time, the filling level was measured to be 2030 mm using the conventional radar level gauge system. At the same time, the change in the distance Δd from the measurement position 7 to the target position 9 was measured using the non-intrusive contactless filling level determination system 1 (referring to FIGS. 1A-C).

As can be seen in FIG. 6, a linear distance change of about 0.8 mm could be measured when the level in the tank was changed from 1016 mm to 2030 mm. The accuracy was estimated to about 10 μm At a third time $t_3$, discharge of water was initiated and maintained at a substantially constant flow rate until a fourth time $t_4$. At the fourth time, the filling level was measured to be 968 mm using the conventional radar level gauge system.

So far, a filling level determination system 1 comprising a single measurement unit 3 arranged to radiate a transmit signal towards a single target position 9 on the tank wall 11 has been discussed.

Although such a filling level determination system 1 has been shown to provide measurement values that correlate well with the actual filling level in the tank 5, the present inventors have realized that there may be installations in which further improved performance may be desired. For instance in installations where the tank 5 may not only exhibit bulging of the tank wall 11, but also a change in orientation (leaning) that may or may not depend on the filling level of the product 4 in the tank 5, additional information may be desired. Therefore, additional embodiments of the filling level determination system 1 according to the present invention may be configured to acquire a measure indicative of an orientation of the tank 5, and the processing circuitry 17 may be configured to determine the filling level L additionally based on the acquired measure indicative of the orientation of the tank 5. Various ways of measuring an orientation are, per se, known to those of ordinary skill in the art. For instance, a combination of a laser and a photo detector may be used to measure movement of a point on the tank 5 in relation to a fixed structure outside the tank 5.

Alternatively, or in combination, other configurations of the filling level determination system 1 may be less sensitive to changes in tank orientation and/or provide additional information allowing detection and compensation for changes in tank orientation.

Figure 7:
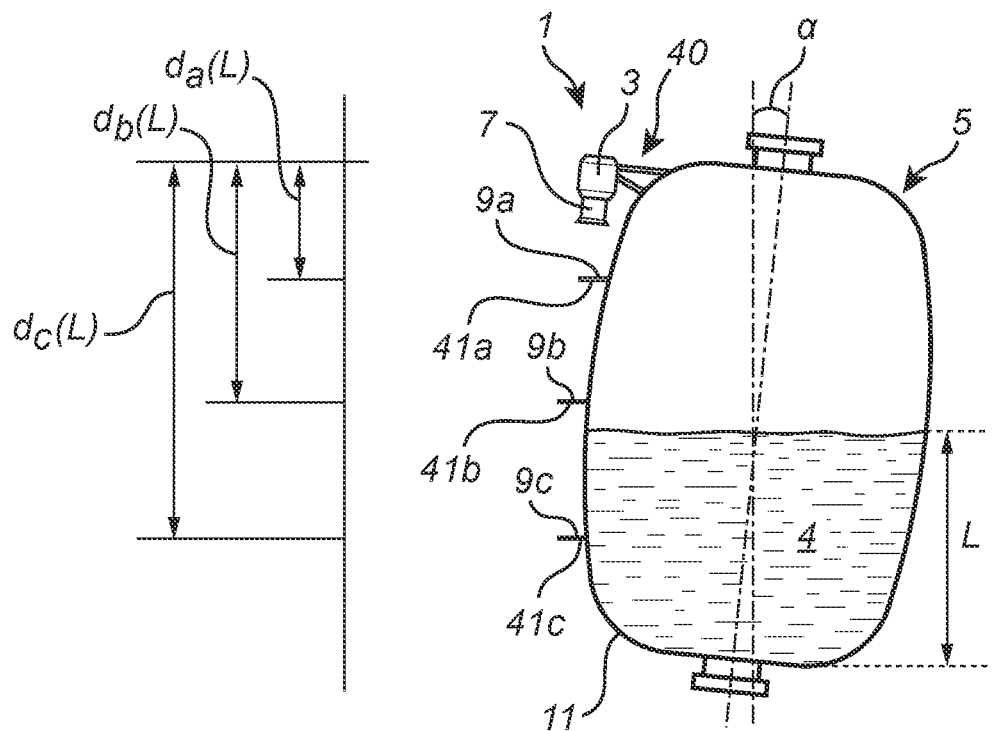
FIG. 7 schematically shows a second example embodiment of the filling level determination system according to the present invention.

In a second example embodiment, schematically shown in FIG. 7, the measurement unit 3 is attached to the tank 5 in such a way that a change in an orientation α of the tank 5 results in a corresponding change in an orientation of the measurement unit 3. Referring to FIG. 7, the measurement unit 3 is attached to the tank wall 11 using an attachment arrangement 40, and microwave reflecting structures 41a-c are attached to the tank wall 11. The microwave reflecting structures 41a-c, which may for example be metal structures welded to the tank wall 11, define corresponding target positions 9a-c on the tank wall 11. In operation, the measurement unit 3 transmits a transmit signal and receives reflection signals resulting from reflection at the first 41a, second 41b, and third 41c microwave reflecting structures. The respective distances $d_a(L)$, $d_b(L)$, and $d_c(L)$ schematically indicated in FIG. 7 will be related to the filling level L, due to deformation of the tank 5, but will be independent of the orientation α of the tank 5. Based on the these distances, and/or changes over time of these distances, tank deformation data, and reference data, the filling level L can be determined.

Figure 8:
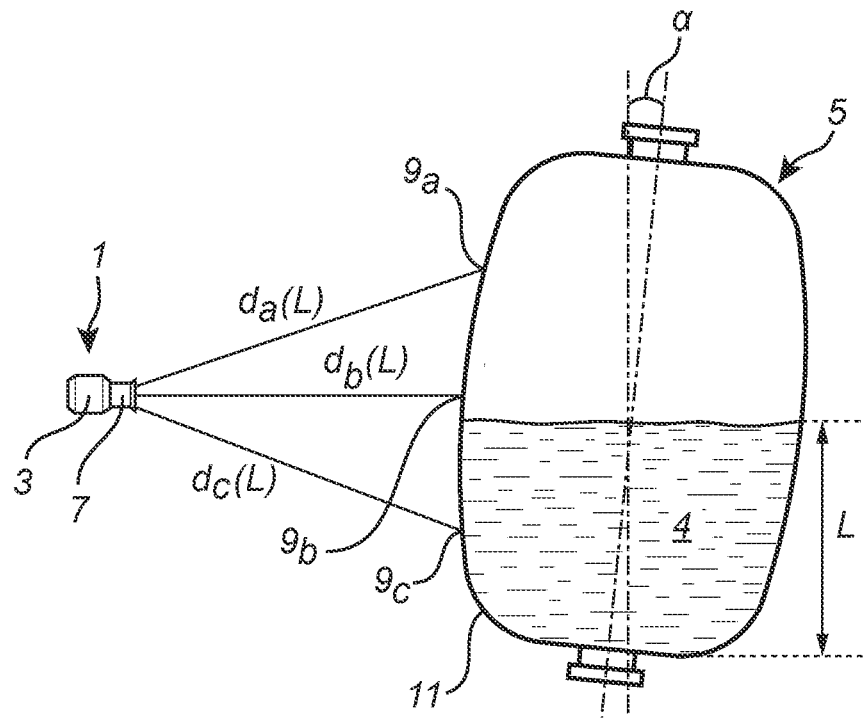
FIG. 8 schematically shows a third example embodiment of the filling level determination system according to the present invention.

In a third example embodiment, schematically illustrated in FIG. 8, the antenna arrangement of the measurement unit 3 may be configured to radiate transmit signals in different directions, so that distances, and/or changes over time of distances, between the measurement position 7 and a plurality of target positions 9a-c on the tank wall 11 can be determined and evaluated. The respective distances $d_a(L)$, $d_b(L)$, and $d_c(L)$ schematically indicated in FIG. 8 will be related to the filling level L, due to deformation of the tank 5, and will also be related to the orientation α of the tank 5. By analyzing the development over time of these distances $d_a(L)$, $d_b(L)$, $d_c(L)$ during a change of the filling level L in the tank, it will be possible to identify and at least partly remove the effect of tank orientation. Based on the these distances, and/or changes over time of these distances, tank deformation data, and reference data, the filling level L can be determined.

Figure 9A:
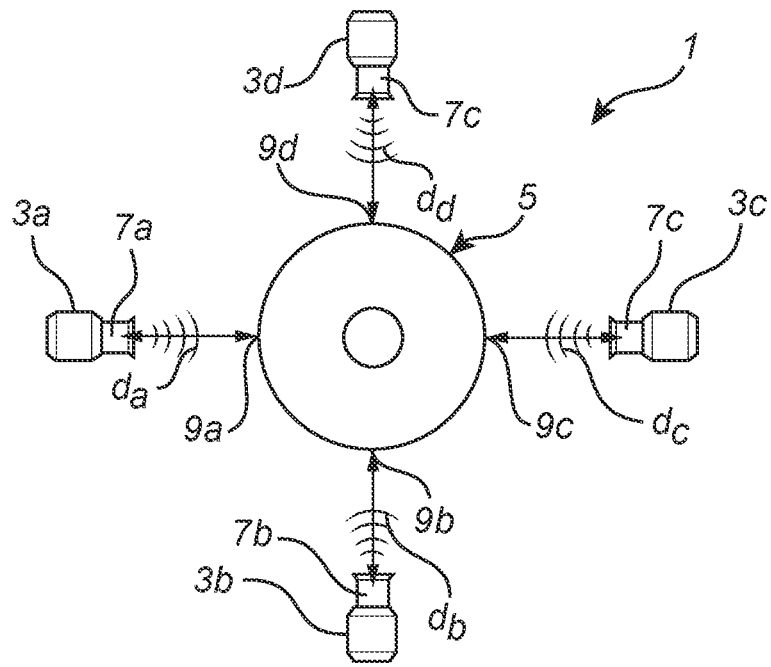
FIGS. 9A-C schematically show a fourth example embodiment of the filling level determination system according to the present invention.
Figures 9B, 9C:
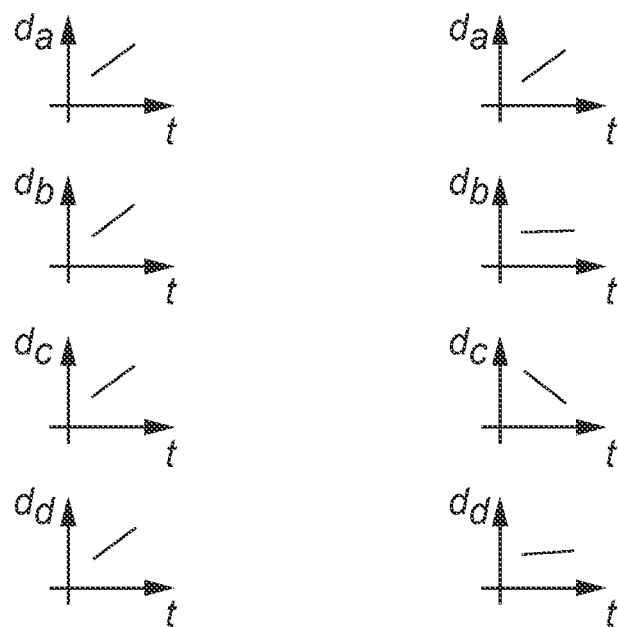

FIGS. 9A-C schematically illustrate a fourth example embodiment of the filling level determination system 1 according to the present invention. Referring first to FIG.

9A, this filling level determination system 1 comprises a plurality of measurement units 3a-d arranged at different measurement positions 7a-d to monitor the distances $d_a$-$d_d$ between the measurement positions 7a-d and respective target positions 9a-d. In FIG. 9A, the tank 5 is seen from above, and in this example configuration of the measurement units 3a-d, analysis of the distances $d_a$-$d_d$ enables the filling level determination system 1 to distinguish between deformation (bulging) of the tank 5 and an orientation change (leaning) of the tank 5.

In FIG. 9B, exemplary and schematic changes in the distances $d_a$-$d_d$ between the measurement positions 7a-d and the target positions 9a-d are shown that are consistent with a change in tank deformation resulting from a change in filling level L. This conclusion can be drawn because the developments over time of all of the distances $d_a$-$d_d$ are similar. In particular, all of the distances $d_a$-$d_d$ are increasing with substantially similar rate of change. This indicates no leaning, and a reduced filling level L.

In FIG. 9C, exemplary and schematic changes in the distances $d_a$-$d_d$ between the measurement positions 7a-d and the target positions 9a-d are shown that are consistent with the tank 5 exhibiting a leaning motion from left to right in FIG. 9A. This conclusion can be drawn because a first set of measurement units 3a, 3c opposite each other indicate opposite trends (increasing distance $d_a$ and decreasing distance $d_c$), and a second set of measurement units 3b, 3d indicate substantially constant distances $d_b$, $d_d$.

The memory 15 and the processing circuitry 17 (referring to FIG. 3) may be distributed among the measurement units 3a-d, or the memory 15 and processing circuitry may be common to the measurement units 3a-d, and arranged in one of the measurement units 3a-d, or separately from the measurement units 3a-d.

As an alternative to or variation of the measurement unit configuration in FIG. 9A, the measurement units 3a-d could be arranged at different vertical levels.

Further measurement units could be added to get a more robust measurement.

The person skilled in the art realizes that the present invention by no means is limited to the preferred embodiments described above. On the contrary, many modifications and variations are possible within the scope of the appended claims. For instance, the transmit signal could be a pulsed signal.

What is claimed is:

1. A filling level determination system, for determining a filling level of a surface of a product in a tank having a tank wall separating an inside of the tank from an outside of the tank, the filling level determination system comprising:
a first measurement unit for arrangement at a first measurement position on the outside of the tank, the first measurement unit including a transceiver for generating, transmitting and receiving electromagnetic signals; and an antenna arrangement coupled to the transceiver for radiating an electromagnetic first transmit signal generated by the transceiver from the first measurement position towards a first target position on the tank wall, and for returning an electromagnetic first reflection signal resulting from reflection of the first transmit signal at the first target position back towards the transceiver;
memory for storing tank deformation data indicative of a known relation between the level of the surface of the product in the tank and deformation of the tank at the first target position, and reference data indicative of a reference distance between the first measurement position and the first target position for a known level of the surface of the product in the tank; and
processing circuitry coupled to the transceiver of the first measurement unit and to the memory, the processing circuitry being configured to:
acquire the tank deformation data and the reference data from the memory; and
determine the filling level based on the tank deformation data, the reference data, and a timing relation between the first transmit signal and the first reflection signal.

2. The filling level determination system according to claim 1, wherein:
the transceiver of the first measurement unit is configured to form a measurement signal based on the first transmit signal and the first reflection signal, the measurement signal being indicative of at least a phase difference between the first transmit signal and the first reflection signal; and
the processing circuitry is configured to determine the filling level based on the tank deformation data, the reference data, and the measurement signal.

3. The filling level determination system according to claim 2, wherein:
the transceiver of the first measurement unit is configured to generate the first transmit signal as a signal exhibiting a time-varying frequency; and
the measurement signal is additionally indicative of a frequency difference between the first transmit signal and the first reflection signal.

4. The filling level determination system according to claim 1, wherein:
the filling level determination system is configured to acquire a measure indicative of an orientation of the tank; and
the processing circuitry is configured to determine the filling level additionally based on the acquired measure indicative of the orientation of the tank.

5. The filling level determination system according to claim 1, wherein the first measurement unit is attached to the tank in such a way that a change in an orientation of the tank results in a corresponding change in an orientation of the measurement unit.

6. The filling level determination system according to claim 1, wherein:
the antenna arrangement of the first measurement unit is configured to radiate an electromagnetic second transmit signal generated by the transceiver from the first measurement position towards a second target position on the tank wall spaced apart from the first target position on the tank wall, and for returning an electromagnetic second reflection signal resulting from reflection of the second transmit signal at the second target position back towards the transceiver;
the tank deformation data is additionally indicative of a known relation between the level of the product in the tank and deformation of the tank at the second target position;
the reference data is additionally indicative of a reference distance between the first measurement position and the second target position for a known level of the product in the tank; and
the processing circuitry is configured to determine the filling level additionally based on a timing relation between the second transmit signal and the second reflection signal.

7. The filling level determination system according to claim 6, wherein the processing circuitry is configured to:
   determine a measure indicative of an orientation of the tank based on a first timing relation between the first transmit signal and the first reflection signal, a second timing relation between the second transmit signal and the second reflection signal.

8. The filling level determination system according to claim 1, wherein:
   the filling level determination system further comprises a second measurement unit for arrangement at a second measurement position on the outside of the tank, different from the first measurement position, the second measurement unit including a transceiver for generating, transmitting and receiving electromagnetic signals; and an antenna arrangement coupled to the transceiver for radiating an electromagnetic second transmit signal generated by the transceiver from the second measurement position towards a second target position on the tank wall, and for returning an electromagnetic second reflection signal resulting from reflection of the transmit signal at the second target position back towards the transceiver;
   the tank deformation data is additionally indicative of a known relation between the level of the product in the tank and deformation of the tank at the second target position;
   the reference data is additionally indicative of a reference distance between the second measurement position and the second target position for a known level of the product in the tank; and
   the processing circuitry is configured to determine the filling level additionally based on a timing relation between the second transmit signal and the second reflection signal.

9. A method of determining a filling level of a surface of a product in a tank having a tank wall separating an inside of the tank from an outside of the tank, the method comprising the steps of:
   radiating an electromagnetic first transmit signal from a first measurement position towards a first target position on the tank wall;
   receiving an electromagnetic first reflection signal resulting from reflection of the first transmit signal at the first target position;
   acquiring tank deformation data indicative of a known relation between the level of the surface of the product in the tank and deformation of the tank at the first target position, and reference data indicative of a reference distance between the first measurement position and the first target position for a known level of the surface of the product in the tank; and
   determining the filling level based on the tank deformation data, the reference data, and a timing relation between the first transmit signal and the first reflection signal.

10. The method according to claim 9, wherein the step of determining the filling level includes the steps of:
   forming a measurement signal based on the first transmit signal and the first reflection signal, the measurement signal being indicative of at least a phase difference between the first transmit signal and the first reflection signal; and
   determining the filling level based on the tank deformation data, the reference data, and the measurement signal.

11. The method according to claim 10, wherein:
   the first transmit signal exhibits a time-varying frequency; and
   the measurement signal is additionally indicative of a frequency difference between the first transmit signal and the first reflection signal.

12. The method according to claim 9, wherein:
   the method further comprises the steps of:
      radiating an electromagnetic second transmit signal from a second measurement position towards a second target position on the tank wall, different from the first target position; and
      receiving an electromagnetic second reflection signal resulting from reflection of the second transmit signal at the second target position;
   the tank deformation data is additionally indicative of a known relation between the level of the product in the tank and deformation of the tank at the second target position;
   the reference data is additionally indicative of a reference distance between the second measurement position and the second target position for a known level of the product in the tank; and
   the filling level is determined additionally based on a timing relation between the second transmit signal and the second reflection signal.

13. The method according to claim 12, wherein the second measurement position is different from the first measurement position.

14. The method according to claim 12, wherein the second measurement position is the same as the first measurement position.

* * * * *